March 23, 1954 H. R. VAN DEVENTER 2,673,242

MEANS FOR CONTROLLING TELEPHONE ANSWERING DEVICES

Filed Dec. 17, 1949

4 Sheets-Sheet 1

INVENTOR.
HARRY R. VAN DEVENTER
BY
Van Deventer & Shively
ATTORNEYS

March 23, 1954 H. R. VAN DEVENTER 2,673,242

MEANS FOR CONTROLLING TELEPHONE ANSWERING DEVICES

Filed Dec. 17, 1949

4 Sheets-Sheet 2

INVENTOR.
HARRY R. VAN DEVENTER
BY
Van Deventer & Shirley
ATTORNEYS

INVENTOR.
HARRY R. VAN DEVENTER
BY
Van Deventer & Shively
ATTORNEYS

March 23, 1954 H. R. VAN DEVENTER 2,673,242

MEANS FOR CONTROLLING TELEPHONE ANSWERING DEVICES

Filed Dec. 17, 1949

4 Sheets-Sheet 4

INVENTOR.
HARRY R. VAN DEVENTER
BY Van Deventer & Shively
ATTORNEYS

Patented Mar. 23, 1954

2,673,242

UNITED STATES PATENT OFFICE 2,673,242

MEANS FOR CONTROLLING TELEPHONE ANSWERING DEVICES

Harry R. Van Deventer, New York, N. Y., assignor, by mesne assignments, to Telephone Answering and Recording Corporation, New York, N. Y., a corporation of Delaware Application December 17, 1949, Serial No. 133,507

36 Claims. (Cl. 179—6)

This invention relates to a means for controlling telephone answering devices and more particularly to such devices using magnetic recording mediums.

For the purpose of illustration, the commonly used paper tape type of recorder is shown. The tape moving mechanism herein shown is standard and it will be understood that any one of many types now commonly used may be employed. The details of the recorder per se shown herein are omitted to avoid prolixity. It will also be obvious that certain of the control methods here used are equally applicable to disc type phonographs.

Many problems are presented by a telephone answering machine using an elongated recording medium such as wire or tape.

A means should first be provided for recording a talkout message so that the subscriber may choose the type of message particularly adapted to his purpose, rather than rely on stock messages made in wholesale quantities by a manufacturer who is unacquainted with said subscriber's needs.

Means should also be provided to play back the talkout message so that the user may check the wording of same.

Means must also be provided for starting said talkout message when a call is received, for connecting the talkout phonograph circuit to the telephone line so that said message will be received by the calling party, and to time the talkout message in such a manner that a switch will be operated at its finish so as to disconnect the talkout phonograph and connect a recording phonograph to the telephone line so that the calling party may record a message thereon.

While the recording phase of the cycle is operating, the tape containing the talkout message must re-wind automatically to its starting position and there stop, regardless of the length of recording phase time.

At the end of the recording phase of the cycle, the machine must automatically shut itself off and in so doing reset itself for the following call.

In the present invention it was preferred, for the sake of simplicity and economy, to have a fixed cycle timing means whereby the telephone line is held in "busy" condition for the complete length of the cycle, regardless of the length of time actually used.

Means are also provided, in the present invention, for playing back recorded messages using the receiver of the telephone instrument as a reproducer for recording locally using the telephone transmitter as a microphone, and for recording both sides of a telephone conversation.

In addition, means are provided to manually re-wind either of the records separately and to erase any recording thereon when so desired.

These and other objects are attained by the present invention, a preferred embodiment of which will now be described. It will be understood, however, that this disclosure is merely illustrative and not limitative, the invention being as defined by the appended claims.

Figure 1A:
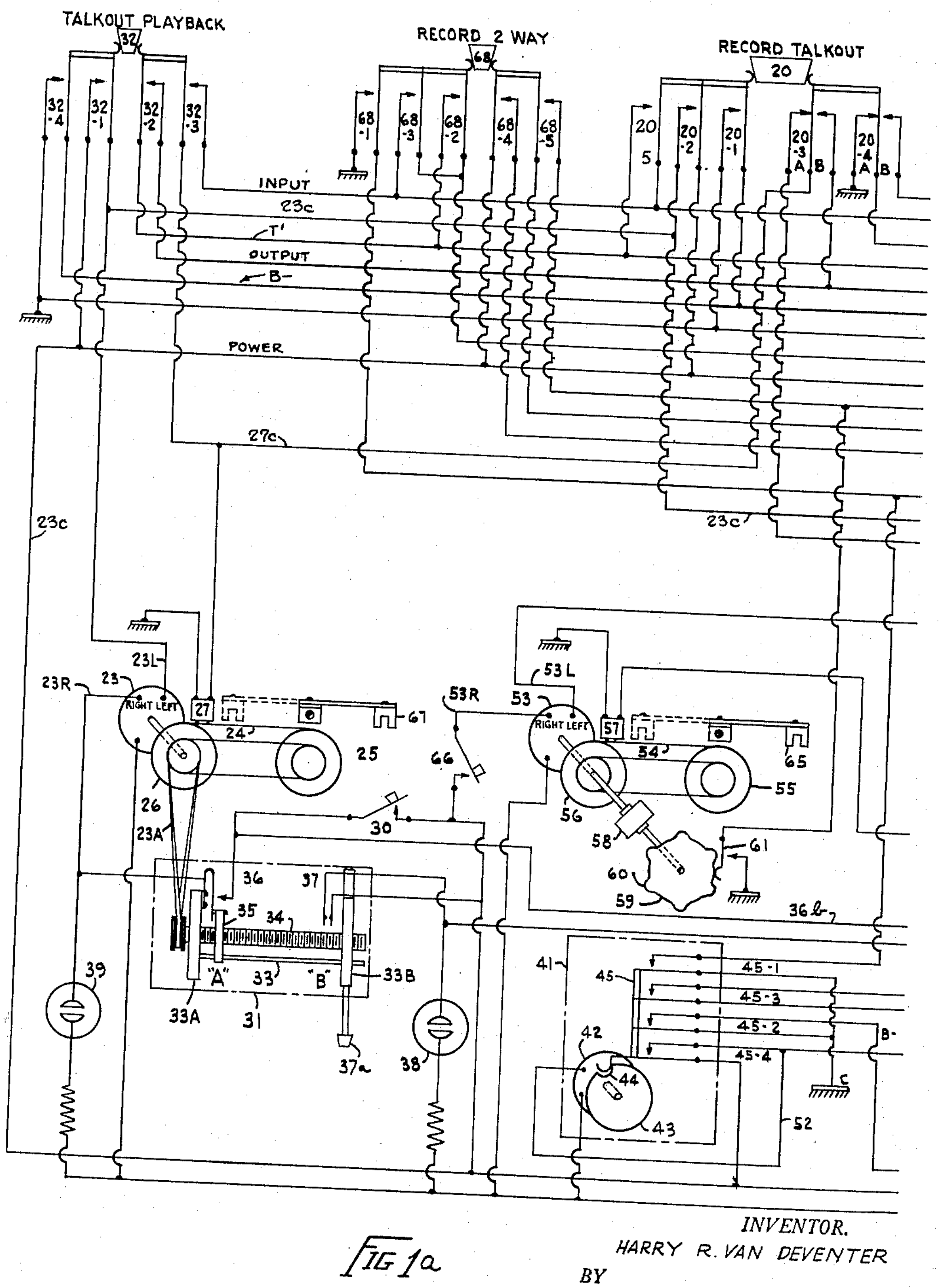
Figure 1B:
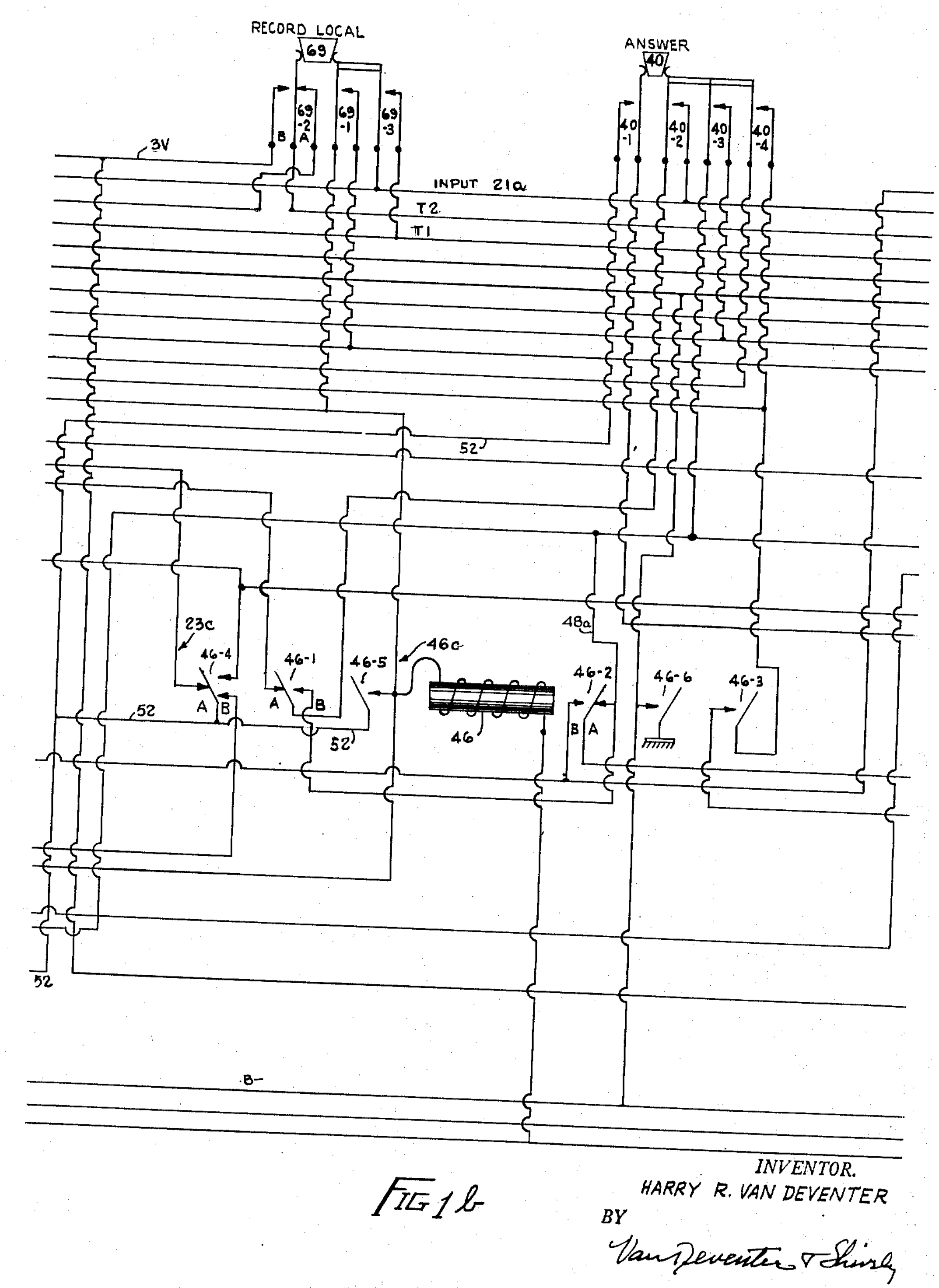
Figure 1C:
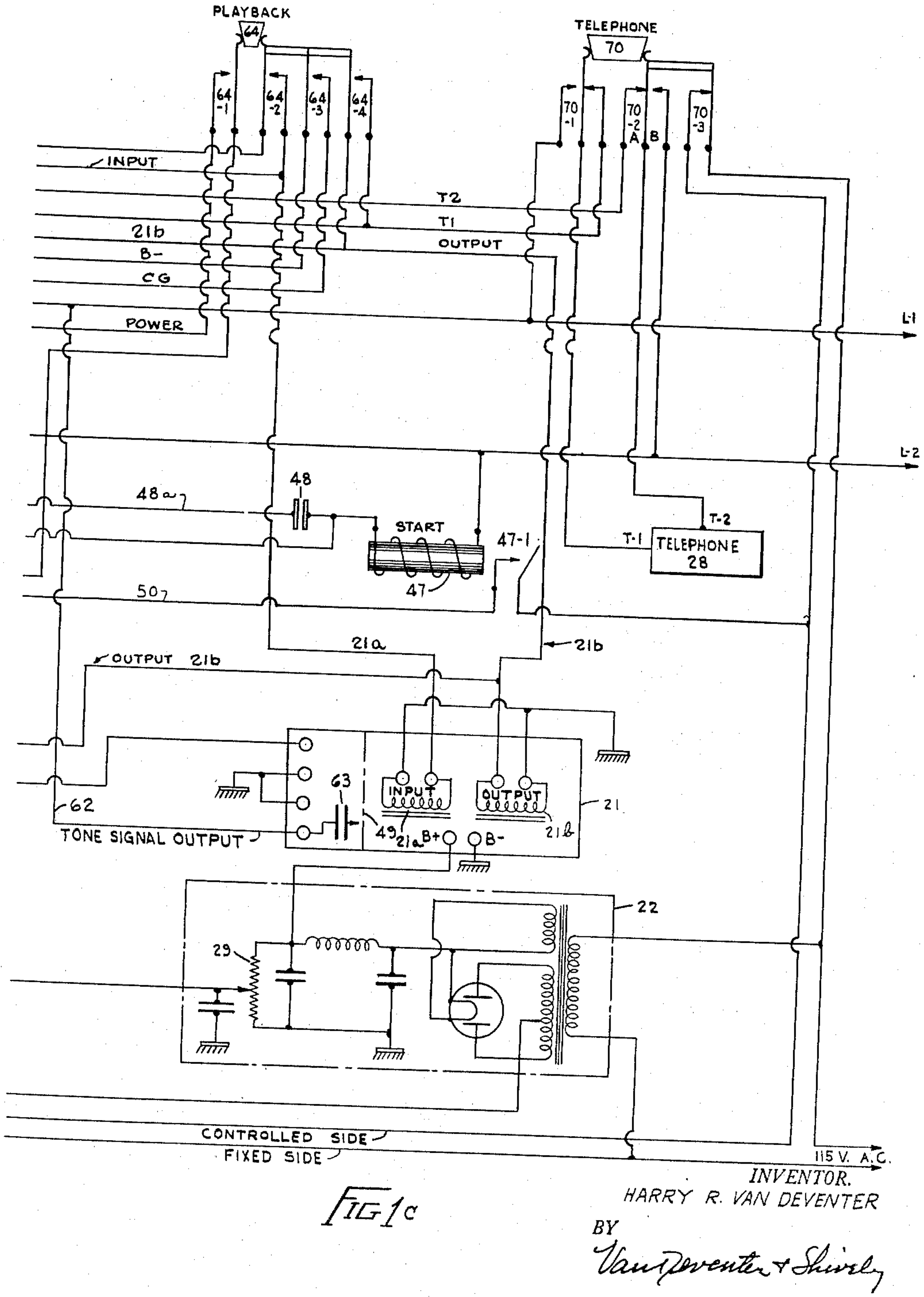
Figure 2:
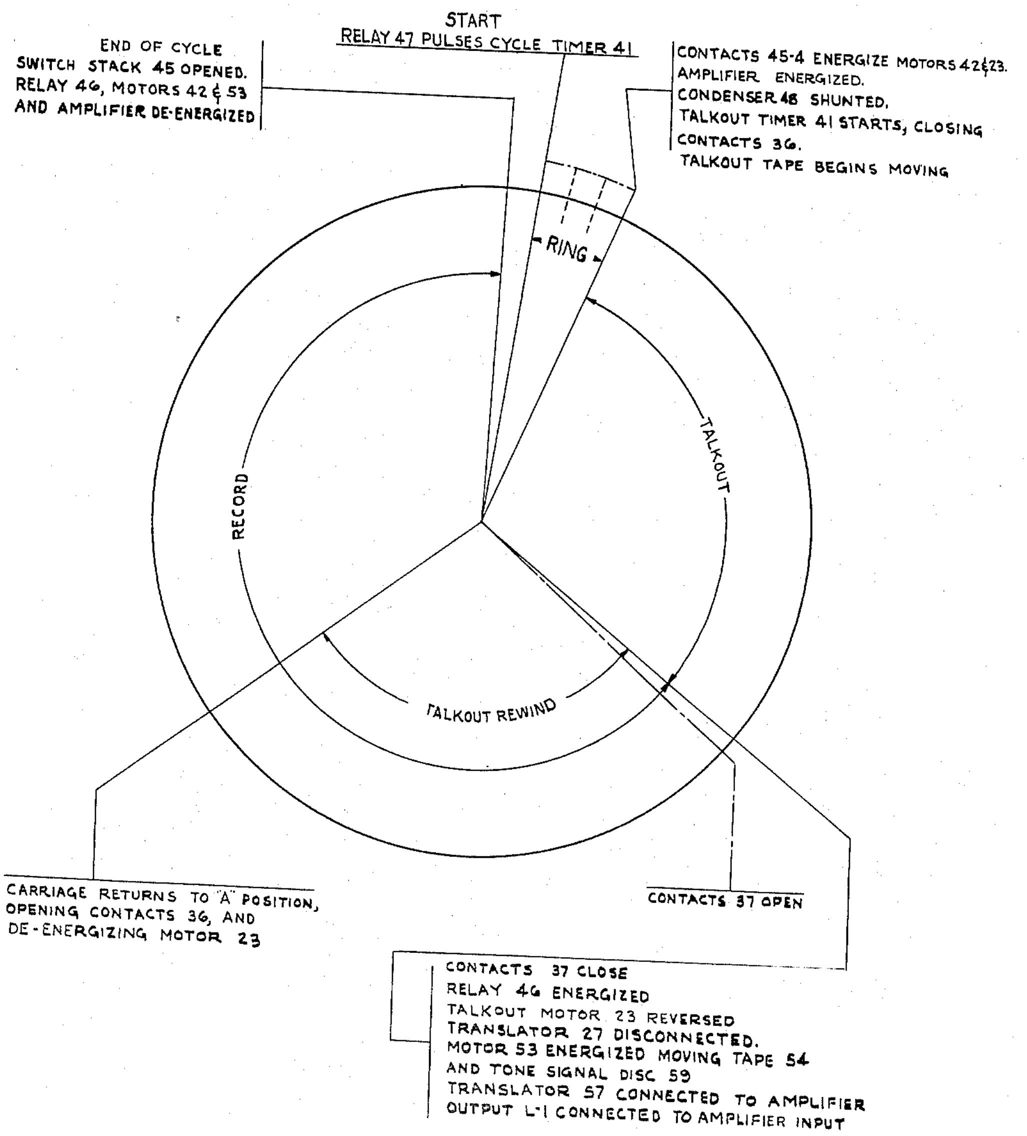

In the accompanying drawings:

Figures 1*a*, 1*b* and 1*c* form together a diagram of the circuits and apparatus of a device embodying the invention; and Figure 2 is a polar diagram illustrating the cycle of operations of the device shown in Figures 1*a*, 1*b* and 1*c*.

Throughout the following description, the two sides of the current supply line will be referred to as the "fixed" side and the "controlled" side, one side of said supply lines being permanently connected to the various components and the other side being switched or controlled.

It will be understood that the device here described is usually used alongside the standard telephone instrument the cord of which connects to the T1, T2 terminals in the device. The subscriber can therefor easily manipulate the keys of the device to record the talkout message, playback, etc., as hereinafter described.

*Recording the talkout message*

A push button 20 is depressed, its contacts 20–1 energizing the amplifier 21 by closing the negative side of the amplifier power supply 22. Contacts 20–2 of the same push button close to energize the talkout driving motor 23 via conductor 23*c*, said motor being of the bi-directional type which normally rotates in a left hand direction to move the tape 24 from the magazine reel 25 to the take-up reel 26, and rotates in a right hand direction to re-wind said tape. Contacts 20–2 also complete a circuit via A–46–4 in relay 46 and conductor 52 to the timer motor 42, which operates but does not function. Contacts 20–3 open at A (to disconnect the translator 27 from the input 21*a* of the amplifier 21) and close at B to connect translator 27 to the output 21*b* of said amplifier. Contact 20–4 opens at A to disconnect the return T2 of the telephone instrument from the common chassis ground to which is connected the negative side of the amplifier power supply and, through the B side of contacts 20–4, connect an exciting voltage in series with said return. This voltage is described in the copending application Serial No. 30,533, filed June 21, 1948, as being derived from a tap on the bleeder resistor 29 in the amplifier power supply 22. In this manner, the telephone transmitter may be used as a microphone for recording the message, the circuit therethrough being completed via contacts 20-5 and input 21a.

Upon releasing button 20, the tape may be rewound by holding down a push button 30 which energizes the motor 23 in right hand rotation by connecting its right hand winding to the controlled side of the current supply line.

*Playing back the talkout message*

After the talkout message has been recorded, it should be played back to check the wording and to set its timer shown within the broken lines at 31. A push button 32 is operated which, through its contacts 32-1, via conductor 27c energizes the motor 23 in left hand rotation for playing, and via contact A-46-4 on relay 46, starts timer motor 42. The timer performs no function during this playback operation. Contacts 32-2 connect the T-1 side of the telephone instrument to the output of the amplifier, while contacts 32-3 via conductor 27c connect the translator 27 to the input of the amplifier. Contacts 32-4 energize the amplifier by closing the negative side of its power supply. The telephone receiver is then used as a reproducer for listening to the message.

The timing device 31 may be connected to and driven by the talkout drive motor 23 or may be driven in any manner that insures that the movable member 35 thereof is moved in timed relation to the movement of the record 24. The device 31 includes a guide rail 33 mounted between two plates 33-a and 33-b. The latter may be adjustable along the guide rail 33 by means of clamp screw and knob 37a. A screw 34 is revolvably mounted in the plates 33-a and 33-b and driven by the motor 23 via the belt 23A.

A carriage 35 is threaded through its body to fit the screw 34, and has near its forward extremity a hole parallel to the threaded hole to fit the guide rail 33, the unit being so assembled that when the screw 34 is turned, the carriage 35 will ride the screw in either direction, depending upon the direction of rotation of said screw, and be held in the proper plane by the guide rail 33.

A fixed set of contacts 36 positioned at the starting point A are normally held open as shown by the carriage member 35 and an adjustable set of contacts 37 are mounted on 33b so as to be movable along the length of the screw 34.

The carriage 35 is set so that the contacts 36 are held open at the start of the talkout and, as the talkout message progresses through its length, the screw 34 moves the carriage 35 from A toward B, permitting contacts 36 to close and remain closed setting up or enabling the circuit 36b to contact B-46-4 on relay 46 as the carriage travels toward B.

Contacts 37 having been previously set at the extreme right at B, at the end of the talkout message the operator releases the push button 32 de-energizing the motor 23, and contacts 37 are then moved to the left into operative relationship with the carriage 35 and the knob and screw 37a used to lock the contacts 37 at the proper place on rail 33.

This closes contacts 37 and a neon indicator lamp 38 is lit to show the user that his talkout timer is properly set to operate at the end of his talkout message. After the adjustment just described has been made the tape 24 is re-wound by holding down the push button 30, which action will also return the timer member 35 to its starting position at A by reason of the fact that the direction of rotation of motor 23 being reversed, the rotation of the screw 34 is likewise reversed.

On reaching its starting position at A the carriage 35 opens the switch 36, which de-energizes the motor 23 and extinguishes the neon lamp 39, thus indicating the return to the starting point of the talkout record and the resetting of timer 31 to starting position.

*Answering incoming calls and taking a message from the calling party*

A push button 40 (marked "Answer" in Fig. 1b), is operated which sets up the circuits for this function of the device. Contacts 40-1 of said push button set up a circuit via conductors 52, 51, 50 to a motor driven timer shown within the broken lines at 41 which controls the length of the answering cycle, and to the normally open contact 47-1 of relay 47.

Said timer is of any suitable type and may be pre-set to operate for any desired period and is automatically re-set after each operation. Said timer includes a motor 42 driving a cam 43 having an indentation 44 at one point in its perimeter and a stack of switch contacts 45 positioned adjacent the cam 43. The contact 45-H nearest the cam 43 is elongated and has a curved portion at its outer end which rests in the indentation 44 in such a manner that when the cam 43 moves, the switch contacts will be operated.

Contacts 40-2 on push button 40 close to connect the input of the amplifier 21 (to the talkout translator 27) through the A side of contacts 46-1 on relay 46 and through the A side of contacts 20-3 on push button 20 via conductor 27c to the talkout translator 27.

Contacts 40-3 of push button 40 close to connect L-1 of the telephone line to the output of the amplifier via conductor 48a through the A side of contacts 46-2 on relay 46 and at the same time a relay 47 with its associated condenser 48 is connected across the telephone line. Contacts 40-4 close to set up the circuit of the tone warning signal generator 49 which is grouped with the amplifier 21. The use of said tone warning signal will be later described.

When a call is received, relay 47 closes its contacts 47-1 to momentarily connect the controlled side of the current supply line to the timer motor 42 via conductors 50, 51, contacts 40-1 on push button 40, and conductor 52. Said motor moves the cam 43 slightly upon each pulse of ringing current and finally, depending on the breadth of the indentation 44, the cam moves far enough to operate the switch stack 45.

In closing, contacts 45-1 on the timer connect the chassis ground return to L-2 of the telephone line. If desired, contacts 45-1 may be omitted and conductor L2 thereat connected directly to the chassis "ground" C, which is not an earth connection, so its permanent connection to the telephone line circuit is not objectionable. This C is usually the chassis or frame of the amplifier.

Contacts 45-2 energize the amplifier by closing the negative side of its power supply. Contacts 45-3 close to short circuit the condenser 48 so as to leave the relay 47 across the line to operate the supervisory relay at the telephone exchange as D. C. current will flow therethrough when the condenser 48 is shorted. Also, in closing, contacts 45-4 connect the timer motor 42 to said controlled side of the current supply so that said motor begins to move steadily and is now independent of relay 47.

When the conductor 52 is connected via contacts 45-4 to the controlled side of the supply line as previously described, motor 23 is steadily energized by means of its being connected to the conductor 52 through the A side of contacts 46-4 of relay 46. The talkout translator 27 is connected to the input of the amplifier via the A side of contacts 20-3 on push button 20, the A side of contacts 46-1 on relay 46 and contacts 40-2 on the push button 40. The L-1 side of the telephone line is connected to the output of the amplifier through contacts 40-3 on push button 40 and the A side of contacts 46-2 on relay 46. The coil of relay 47 is across the output of the amplifier at this point but, by reason of its high impedance, has no effect on the operation thereof.

As the talkout tape 24 begins to move steadily, the previously described carriage 35 of timer 31 moves away from its A position, closing contacts 36, and toward its B position where, at the end of the talkout message, it closes contacts 37 which connect the controlled side of the current supply line to the mid-cycle relay 46, said relay locking itself in energized condition by means of its contacts 46-5. In moving its contacts 46-4 from A to B position, relay 46 energizes a motor 53 in left hand rotation, which moves the recording or message taking tape 54 from its magazine reel 55 to its take-up reel 56, the same set of contacts disconnecting at its A side the left hand rotation winding of the talkout motor 23 and connecting at its B side and through contacts 36 on the talkout timer, the right hand rotation winding of the motor 23, which action automatically re-winds the talkout tape 24 and reverses the motion of the carriage 35, moving same from its B position to its A position, where contacts 36 open to disconnect the re-wind circuit of the motor 23 and stop same.

Meanwhile, when relay 46 was energized moving its contacts 46-1 from A position to B position, it connected through contacts 40-3 on push button 40, the L-1 side of the telephone line to the input of the amplifier through circuits 40-2 on push button 40, and the translator 57 is connected, via the B side of contacts 46-2 on relay 46 to the output of the amplifier, so that any speech on the telephone line will be expressed through the amplifier into the translator 57 and be recorded therefrom on the tape 54.

Connected to the take-up reel 56 and driven therefrom through a suitable speed reducer 58 is a disc 59 having elevations 60 evenly spaced about its perimeter and a switch 61 so situated and adjacent said disc as to be operated by said elevations when the disc 59 is in motion. One contact of the switch 61 is connected to the tone signal generator (shown at 49 in the amplifier 21) through contacts 40-4 on the push button 40 and contacts 46-3 on relay 46, the other contact of switch 61 being connected to the chassis ground return, so that regardless of whether or not, during a previous call, the disc 59 has been stopped in such a position as to hold the switch 61 closed, the tone signal circuit is not completed until relay 46 is energized.

The output of the tone signal generator 49 is connected via conductor 62 to L-1 of the telephone line through a low capacity condenser 63, the capacity of which determines the strength of the tone signal on the telephone line, so that when the disc operated switch 61 is closed, contacts 46-3 on relay 46 being closed, and contacts 40-4 on push button 40 being closed, the control circuit of the tone signal generator is completed to the chassis ground return and the signal is expressed into the telephone line.

Meanwhile, the cam 43 of the cycle timer 41 has been moving, having been started at the beginning of the cycle as previously described, and having made one complete revolution during the cycle, returns to its starting position, opening the contacts of switch stack 45. In opening its contacts 45-4, the controlled side of the supply line is disconnected from conductor 50 through conductor 52 and contacts 40-1 on push button 40 and conductor 51, thus de-energizing the relay 46 and re-setting all circuits for the following call.

Should the calling party hang up before the cycle timer 41 has completed its revolution, the line to which the device is connected is simply held in busy condition until said timer opens its contacts 45-3 removing the shunt across the condenser 48, at which time the telephone line is restored to normal on-hook condition. The sequence of operations during this function of the device is shown in Fig. 2.

*Playing back recorded messages*

Messages that have been recorded by the machine during calls answered may be played back by the subscriber in the following manner.

Push button 64 is depressed and through its contacts 64-1 connects the controlled side of the supply line to the left hand drive of the tape driving motor 53, thus moving the tape 54 at a uniform speed. Contacts 64-2 of the same push button connect the translator 57 to the input of the amplifier and contacts 64-3 energize the amplifier by closing the negative side of its power supply. Contacts 64-4 connect the T-1 side of the telephone instrument 28 to the output of the amplifier 21: T2 is connected to chassis ground at 69-2 in button 69 and 20-4 in button 20 so that any recording on the tape is picked up by the translator 57 and expressed through the amplifier 21 to be heard in the telephone receiver.

A small permanent magnet 65 is shown in Fig. 1 as being positioned adjacent the tape 54 in such a manner as to be manually swivelled in and out of engagement with said tape, magnet 65 being used as an eraser to clear the tape of recording when so desired. The erasing process may take place during the re-wind of tape 54, said re-wind being accomplished by simply holding down the push button 66 which connects the controlled side of the supply line to the right hand rotation winding of the motor 53.

A similar magnet 67 is mounted in a like manner adjacent the talkout tape 24 so that one talkout message may be erased and another recorded in its place.

Permanent magnet erasers were used in this case for reasons of economy and simplicity of operation, the high frequency erasers commonly used in magnetic recorders being considered superfluous in a device of this kind where the fidelity of output is only consistent with the fidelity of the telephone circuit.

*Recording a two-way telephone conversation*

A push button 68 is depressed closing its contacts 68-1 to connect L-2 of the telephone line to the chassis ground return. Contacts 68–2 and 68–3 close to connect L–1 of the telephone line and T–1 of the telephone instrument to the input of the amplifier 21 and contacts 68–4 close to energize the relay 46 (via conductor 46c) which, in closing its contacts 46–4, energizes the motor 53. In moving from A to B, contacts 46–1 disconnect the talkout translator 27 through contacts 20–3 on push button 20 and through contacts 46–2, the translator 57 is connected to the output of the amplifier.

Contacts 68–5 on push button 68 and contacts 46–3 on relay 46 and switch 61 are serially included in the tone signal generator control circuit so that, during the period of time that two-way recording is being used, a tone signal will be impressed on the telephone line at intervals as previously described under the heading "Answering incoming calls." Contacts 46–6 on relay 46 energize the amplifier by closing the negative side of its power supply.

*Recording locally using the telephone transmitter as a microphone*

Using the push button 69 enables the subscriber to use the machine as a straight recorder for the purpose of dictation, etc. Contacts 69–1 connect the controlled side of the supply line to the relay 46 which, in closing its contacts 46–4, energizes the motor 53 in left hand rotation. Contacts 46–2 of relay 46 connect the translator 57 to the output of the amplifier and contacts 46–6 energize the amplifier by closing the negative side of its power supply. Contacts 69–2, in moving from A to B insert a voltage in series with the T–2 side of the telephone instrument 28 in the same manner as described under the heading "Recording the talkout message" and contacts 69–3 connect the T–1 side of the telephone instrument to the input of the amplifier, so that speech expressed into the telephone transmitter will be amplified to the translator 57 to be recorded on the tape 54. Timer 42 operates but does not function during this operation.

*Normal telephone operation*

The use of the push button 70 enables the telephone instrument to be used as any standard telephone by simply connecting said telephone instrument to the L–1 side of the telephone line through its contacts 70–1 and to the L–2 side of the telephone line through the B side of contacts 70–2. In moving from A to B, contacts 70–2 disconnect the chassis ground return so that there will be no possibility of a leakage circuit across the telephone line. Contacts 70–3 of the same push button disconnect the supply line at a point which disables all of the controlled components excepting the amplifier so that, should it be desired to switch to two-way recording during a telephone conversation, the amplifier will have been on and ready for use rather than it being necessary to wait for its tubes to reach the proper operating temperature.

It will be understood that the push buttons 20, 32, 40, 64, 68, 69 and 70 may be of any suitable type wherein when one button is depressed it locks itself in operating position, releasing any previously operated button. Any suitable form of rotary gang switch may be employed.

The details of the amplifier 21 and power supply 22 and the tone signal generator 49 are not shown in detail, as any known suitable devices can be used. However, it will be noted that at all times when the device is connected to the telephone line circuit, that either of the windings 21A or 21B are interposed between said circuit and the amplifier. The device is therefore inductively coupled to the telephone line circuit.

And while the peep generator 49 is connected directly to the telephone line circuit L–1 via condenser 63 (about .00005 mfd.), if desired this permanent direct connection can be replaced by normally open contacts in the push buttons 40 and 68 in a manner that is obvious.

The motors 23 and 53 are shown as reversible. Instead of such motors, the take-up reels 26 and 56 may be provided with anti-clockwise motors (one direction only) and the magazine reels 25 and 55 with clockwise motors. If this four-motor arrangement is desired, the fixed side of the 110 volt circuit connects to one terminal of all motors, conductor 23L to the motor 23 connected to reel 26, conductor 23R to the motor (not shown) connected to reel 25. Conductor 53L connects to motor 53 as shown and conductor 53R to the motor (not shown) connected to reel 55. As the arrangement just described is clear from the description, it is not shown in the drawings.

By placing a pair of normally open contacts (not shown) on keys 20, 32, 64 and 68 and connecting same to conductors 48a and L–1, the relay 47 and condenser 48 will be connected across the circuit L–1, L–2 when these keys are operated, thus insuring that the telephone line circuit is not left open at any time.

As this arrangement will be readily understood from the foregoing, it is not illustrated in Figs. 1a, b, c, to avoid complicating the diagram.

What is claimed is:

1. In a device of the character described, a support, a record movably carried on said support and having an initial starting position, a translator in cooperative relation with said record, a motor associated in driving relation with said record, a timer having a movable member, means to move said member in timed relation with the movement of said record, settable control contact means in said timer, an indicator in a circuit with a source of current and said contact means, said circuit being adapted to be completed by the latter, switch means connected in a circuit with a source of current and said motor for controlling the latter, and means connected to said translator for recording sound on said record, said indicator serving as a check on the setting of said timer.

2. The device as claimed in claim 1 including a second manually operable switch means connected to said source and to means in said motor to effect the return of said record to its initial starting position, when said second switch means is operated.

3. A device according to claim 1, in which said record is comprised of an elongated magnetizable medium, and in which said motor is reversible and associated with means for driving it in either direction.

4. In a device of the character described, a support, a record movably carried on said support and having an initial starting position, a translator in cooperative relation with said record, motor means and mechanism associated in driving relation with said record to drive it in either direction, switch means connected to said motor means and to a source of current to effect the movement of said record in a direction to receive a sound recording thereon, a timer having a movable member, means to drive said member in timed relation to the movement of said record, settable contacts in said timer, an indicator connected in a circuit with said contacts and a source of current, whereby the closing of said contacts by said member may indicate the termination of a recording, control means in said timer to effect the movement of the record in the opposite direction to its initial starting position, and means including an amplifier having its input connected to said translator and a reproducer connected to its output for playing back said recording.

5. In combination with a telephone line circuit, a relay connected to said circuit and responsive to incoming ringing current thereover, a support, a record movably carried on said support and having an initial starting position, said record containing a sound recording, motor means and mechanism associated in driving relation with said record for moving the same in either direction, a circuit including said motor, a source of current, and contacts in said relay; a translator in cooperative relation with said record for reproducing sound therefrom, a timer having a movable member thereon, means to drive said movable member in timed relation to the movement of the record, contacts in said timer adapted to be actuated by said member at the completion of said sound recording, a second relay having a winding connected in a circuit with said contacts and a source of current, and contact means on said last relay connected in a circuit with said translator and said line circuit to deliver a reproduction of said recording to said line circuit.

6. The invention according to claim 5, wherein said timer includes additional contacts actuated by said movable member and timed to close during the operation of said second relay, and wherein means controlled by said additional contacts and operatively connected to said motor means effects the restoring of said record to its initial starting position and the stopping of the same.

7. In combination with a telephone line circuit, a relay connected to said circuit and responsive to incoming ringing current thereover, a support, a record movably carried on said support and having an initial starting position, said record containing a sound recording, motor means and mechanism associated in driving relation with said record to drive it in either direction, a translator in cooperative relation with said record for reproducing sound therefrom, a timer having a movable member thereon, means to drive said movable member in timed relation to the movement of the record, control contacts in said timer adapted to be actuated by said member at the completion of said sound recording, a second relay having a winding connected in a circuit with said contacts and a source of current, contact means on said last relay connected in a circuit with said translator and said line circuit to deliver a reproduction of said recording to said line circuit, and a second timer operatively connected to and controlled by said first relay and having contacts connected to a winding on said second relay and to said source of current for controlling the operation of said second relay.

8. In combination with a telephone line circuit, a relay connected to said circuit and responsive to incoming ringing current thereover, a support, a record movably carried on said support and having an initial starting position, said record containing a sound recording, motor means and mechanism associated in driving relation with said record to drive it in either direction, a translator in cooperative relation with said record for reproducing sound therefrom, a timer having a movable member thereon, means to drive said movable member in timed relation to the movement of the record, control contacts in said timer adapted to be actuated by said member at the completion of said sound recording, a second relay having a winding connected in a circuit with said control contacts and a source of current, contact means on said last relay connected in a circuit with said translator and said line circuit to deliver a reproduction of said recording to said line circuit, a second timer operatively connected to and controlled by the intermittent operation of said first relay and having contacts connected to a winding on said second relay and to a source of current for controlling the operation of said second relay, and means in said second timer to lock said last contacts closed and to thereby hold the same in operation for a predetermined period independent of said first relay.

9. The invention according to claim 8, wherein said circuit connected to said contact means on said second relay includes an amplifier having an input circuit, to which said translator is connected, and an output circuit connected to said line circuit.

10. The invention according to claim 8, characterized by: the provision of additional contacts in said second relay, the provision of a recording phonograph having a motor, a second translator in cooperative relation to a record on said phonograph, an amplifier; circuit means including some of said last contacts, said last motor, and the output of said amplifier; and connections between others of said last contacts and said line circuit.

11. In a device of the character described, a reproducing phonograph carrying a record having an initial starting position, a translator in cooperative relation to said record, motor means associated in driving relation with said reproducing phonograph, a recording phonograph carrying a record medium, a second translator in cooperative relation to said medium, electrical means responsive to telephone ringing current on said line and including a speech circuit between said first phonograph and said line adapted to be completed by said ringing current for delivering speech to said line, and electrical instrumentalities including means operable upon the termination of speech from said first phonograph for disconnecting said first phonograph from said line circuit and connecting said second phonograph thereto to effect a recording operation, and means operative during said operation for returning said record to its initial starting position.

12. The invention according to claim 11, wherein the means in said instrumentalities comprises a timer having adjustable contacts for controlling the disconnection of said first phonograph from and the connection of said second phonograph to said line circuit.

13. In a device of the character described, a relay connected to a telephone line circuit and responsive to ringing current therefrom and having contacts adapted to close upon such response, a timer connected to said contacts and to a source of current, a set of normally open contacts operated by said timer and connected in parallel with said first contacts to short circuit the latter during the operation of said timer for a predetermined period, a phonograph, a motor operatively connected to said phonograph, circuit means to supply energy to said motor, a translator in cooperative relation with a record in said phonograph, other contacts in said timer, and a circuit including said other contacts, said translator and said line.

14. The combination according to claim 13 including a second timer controlled by said first timer, a movable member in said second timer and means to move the same, normally open contacts carried on said second timer, a second relay having a winding connected in series with said last contacts and a source of current, and a pair of cooperative contacts on said second relay included serially in said circuit means to stop said motor in time with the energization of said second relay.

15. The invention according to claim 13, including a second timer controlled by said first timer, a movable member in said second timer and means to move the same, normally open contacts carried on said second timer, a second relay having a winding connected in series with said last contacts and a souce of current, said circuit means of the motor including means to reverse the motor, a second set of contacts on said last timer, a set of normally open contacts on said last relay, and serial connections between said second set of contacts, the set of normally open contacts and said circuit means to reverse the motor and rewind the record upon the operation of said second timer and said second relay.

16. The invention according to claim 13, including a second timer controlled by said first timer, a movable member in said second timer and means to move the same, normally open contacts carried on said second timer, a second relay having a winding connected in series with said last contacts and a source of current, said circuit means of the motor including means to reverse the motor, a second set of contacts on said last timer, a set of normally open contacts on said last relay, and serial connections between said second set of contacts, the set of normally open contacts and said circuit means to reverse the motor and rewind the record upon the operation of said second timer and said second relay, and a manually operable switch connected in series with a source of current and said motor to manually institute a record rewinding operation.

17. In a device of the character described, a support, a record movably carried on said support and having an initial starting position, recording means in cooperative relation with said record, reversible motor means associated with and for moving said record to receive a sound recording thereon, switch means connected in a circuit with said motor means and a source of current for controlling said motor means, a timer having a movable member therein, means to move said member in timed relation to the movement of said record, a set of contacts in said timer adapted to be held in open starting position by said member when said record is in starting position and releasable to closed circuit position when said record is moved out of starting position, switch means having contacts connected in a circuit with said set of contacts, and said motor means for controlling the latter to cause said recording means and the movable member in said timer to return to their starting positions.

18. In a device of the class described, a sound reproducing device having a record upon which sound has been recorded and a translator in cooperative relation therewith, said record having an initial starting position corresponding to the beginning of the recording, a timer having a movable member displaceable in timed relation to the movement of said device, said member having a normal starting position corresponding to the beginning of said recording, a set of contacts adapted to be held open by said member when in starting position, motor means and mechanism connected thereto for driving said device and said timer, whereby said contacts are closed as said device is operated to reproduce said recording, adjustable means controlled by the movement of said member for terminating the reproduction of said recording, said last means including a second set of contacts spaced apart from the first set, and means and circuits connected to said sets of contacts and said motor means and to a source of current and conjointly controlled by said contacts for resetting said device and said member to said initial starting positions.

19. In combination with a telephone line circuit, a sound reproducing device having a record and a translator cooperating therewith, relay means including a winding responsive to ringing current flowing in said line circuit and having contacts connected to said line and to said device for operatively connecting the latter to said line circuit to deliver a reproduction of the recorded sound thereto, means including a timer having a movable member and sets of cooperative contacts controlled thereby, connections between one of said sets and said reproducing device, adapted to disconnect said reproducing device from said line circuit at the end of the reproduction of the recording on said record, a sound recording device having a record blank and means for impressing a recording thereon, and means including said second set of contacts connected to said sound recording device and to said telephone line circuit and controlled by said timer for operatively connecting said second device to said line circuit to record speech received thereover.

20. In combination with a telephone line circuit, a sound reproducing device having a record and a translator cooperating therewith, relay means including a winding responsive to ringing current flowing in said line circuit and having contacts connected to said line and to said device for operatively connecting the latter to said line circuit to deliver a reproduction of the recorded sound thereto, means including a timer having a movable member and sets of cooperative contacts controlled thereby, connections between one of said sets and said reproducing device, adapted to disconnect said reproducing device from said line circuit at the end of the reproduction of the recording on said record, a sound recording device having a record blank and means for impressing a recording thereon, and means including said second set of contacts connected to said sound recording device and to said telephone line circuit and controlled by said timer for operatively connecting said second device to said line circuit to record speech received thereover, another set of contacts in said timer connected in a circuit with resetting means for returning the record in said first device to its starting position while said recording device is operating.

21. The invention according to claim 19, wherein a second timer is provided having a movable member and means to move the same preset at a predetermined rate, a set of cooperative contacts in said last timer, included in a circuit with said recording device and said line circuit for disconnecting the same after a predetermined period for which said second timer is preset.

22. In combination with a telephone line circuit, a sound recording device including a record comprising a magnetizable medium and a translator cooperating therewith, relay means including a winding responsive to telephone ringing current in said circuit and having two sets of cooperative contacts connected to said line and said device, motor means including mechanism associated in driving relation to said device, a circuit including said motor means and a source of current for operating said motor, whereby sound may be recorded on said record via said telephone line circuit, an amplifier having an input circuit connected via one of said sets of contacts to said telephone line circuit and having an output circuit connected via the other of said sets to said translator, a power supply connected to said amplifier, a tone signal generator connected to said power supply and to said line via contact means driven in timed relation to the movement of said record for delivering said tone signal to said telephone line circuit.

23. In combination, a telephone line circuit having a microphone and a receiver, a sound recording and reproducing instrument including translator means and a magnetizable record medium in cooperative relation, motor means and mechanism associated with said record for moving it in either direction past said translator, an amplifier having input and output circuits, switching means including a series of interconnected switches, means whereby when any one of said switches is actuated its predecessor is completely disconnected from all circuits previously established before any circuits are established by the actuated switch, means including a first switch of said series having cooperative contacts therein one set of which is connected to the input of said amplifier and said microphone and the other set of which is connected to the output of said amplifier and to said translator, whereby speech may be recorded on said record, means whereby said last switch also controls said motor means to effect the movement in the proper direction for a recording to be impressed thereon, means including a second switch of said series for causing said motor means to rewind the record thereon to its starting position, means including a third switch of said series for connecting said receiver to the output of said amplifier and for connecting said translator to the input of said amplifier, whereby speech recorded on said record may be played back via said telephone receiver, said last switch also including circuit means connected to and for controlling said motor means to move said record in the proper direction for reproduction, and means including a fourth switch of said series for connecting said telephone line circuit to the output of the amplifier and for connecting said translator to the input of the amplifier, said last switch also including means whereby said motor means moves the record in the proper direction for reproduction.

24. The combination as claimed in claim 23 wherein said second switch includes a timer driven in timed relation to the movement of the record in said instrument, said timer controlling the institution and the termination of the rewinding period.

25. The combination as claimed in claim 23 wherein said microphone and receiver form part of a telephone instrument, and wherein means including a fifth switch of said series is provided which in one position has contacts connecting said telephone instrument to said line circuit and which opens other contacts, thereby disconnecting all other circuits from said line.

26. The combination as claimed in claim 25 including a ringing relay and cooperative contacts in said fifth switch connected to said relay and the line circuit for connecting said relay to said telephone line circuit when said telephone instrument is disconnected therefrom.

27. In combination with a telephone line circuit, a sound reproducing instrument having a record having a sound recording thereon and a translator in cooperative relation therewith, a motor and mechanism associated with said motor and record for moving the record in either direction, an amplifier having input and output circuits, a first switch means including an electromagnetic device connected to said telephone line circuit and operable by telephone ringing current flowing in said line circuit and having one set of cooperative contacts connected to said translator and to the input of said amplifier and having a second set of contacts connected to said telephone line and the output of said amplifier, said means also including a set of contacts connected to said motor and a source of current for starting said motor and moving said record, whereby said recorded speech may be delivered to said telephone line circuit, means including a second switch means containing an electromagnetic device, means operable upon the termination of the recording period for operating said electromagnetic device whereby same will disconnect said translator from the input of said amplifier and for restoring said record to its initial starting position and for stopping said motor, a sound recorder having a record blank and a translator in cooperative relation therewith, a second motor and mechanism connected thereto for moving said blank, and means including a third switch means controlled by said second switch means having a first set of contacts connected to said second motor and said source of current and a second set of contacts connected to said second translator and to the output circuit of the amplifier, and a third set of contacts connected to the input circuit of the amplifier and to said telephone line, said third set of contacts comprising means for starting the motor of said recorder and for connecting the translator of same to the output circuit of the amplifier and for connecting the input circuit of said amplifier to said telephone line circuit, whereby incoming speech over said circuit may be recorded on said record blank.

28. In combination with a telephone line circuit, a sound reproducing instrument having a record having a sound recording thereon and a translator in cooperative relation therewith, a motor and mechanism associated with said motor and record for moving the record in either direction, an amplifier having input and output circuits, a first switch means including an electromagnetic device connected to said telephone line circuit and operable by telephone ringing current flowing in said line circuit and having one set of cooperative contacts connected to said translator and to the input of said amplifier and having a second set of contacts connected to said telephone line and the output of said amplifier, said means also including a set of contacts connected to said motor and a source of current for starting said motor and moving said record, whereby said recorded speech may be delivered to said telephone line circuit, means including a second switch means containing an electromagnetic device, means operable upon the termination of the recording period for disconnecting said translator from the input of said amplifier and for restoring said record to its initial starting position and for stopping said motor, a sound recorder having a record blank and a translator in cooperative relation therewith, a second motor and mechanism connected thereto for moving said blank, and means including a third switch means controlled by said second switch means having a first set of contacts connected to said second motor and said source of current and a second set of contacts connected to said second translator and to the output circuit of the amplifier, and a third set of contacts connected to the input circuit of the amplifier and to said telephone line, said third set of contacts comprising means for starting the motor of said recorder and for connecting the translator of same to the output circuit of the amplifier and for connecting the input circuit of said amplifier to said telephone line circuit, whereby incoming speech over said circuit may be recorded on said record blank, and a timer including means connected to and adapted to be started by the operation of said first switch means and including means for controlling the period of operation of said second and third switch means, whereby the length of the aforesaid recording on said record blank may be predetermined.

29. In combination with a telephone line circuit, a sound reproducing instrument having a record having a sound recording thereon and a translator in cooperative relation therewith, a motor and mechanism associated with said record for moving the same in either direction, an amplifier having input and output circuits, a first switch means including an electromagnetic device connected to said telephone line circuit and operable by telephone ringing current flowing in said line circuit and having one set of cooperative contacts connected to said translator and to the input of said amplifier and having a second set of contacts connected to said telephone line and the output of said amplifier, said means also including a set of contacts connected to said motor and a source of current for starting said motor and moving said record, whereby said recorded speech may be delivered to said telephone line circuit, means including a second switch means including an electromagnetic device, means operable upon the termination of the recording period for disconnecting said translator from the input of said amplifier and for restoring said record to its initial starting position and for stopping said motor, a sound recorder having a record blank and a second translator in cooperative relation therewith, a second motor and mechanism connected thereto for moving said blank, and means including a third switch means controlled by said second switch means having a first set of contacts connected to said second motor and said source of current and a second set of contacts connected to the translator and to the output circuit of the amplifier, and a third set of contacts connected to the input circuit of the amplifier and to said telephone line for starting the motor of said recorder and for connecting the translator of same to the output circuit of the amplifier and for connecting the input circuit of said amplifier to said telephone line circuit, whereby incoming speech over said circuit may be recorded on said record blank, and means and a fourth switch means for disabling said second and third switch means at the end of a recording period on said record blank, whereby said reproducing instrument is reconnected for operation by said first switch means as aforesaid.

30. In combination with a telephone system, a remote controlled device having a pair of recorders, each having a magnetizable record medium and a translator in cooperative relation therewith, an electric motor and mechanism driven thereby in each recorder for moving the record therein in either a recording or reproducing direction or to a reset position, an amplifier common to both said recorders, an incoming telephone line circuit including a subscriber's telephone instrument, relay means having a winding connected to said line circuit and actuated by ringing current flowing thereover, contact means on said relay for connecting said amplifier to one of said recorders, for energizing the motor of one of said recorders to operate said recorder to transmit a message from the recorder via said amplifier to the telephone line circuit and controlled by said relay means to transmit said message over the same and to said telephone instrument, means and switching means operated on the termination of said outgoing message to connect said amplifier to said telephone line circuit to receive a message from said telephone instrument connected thereto and to connect the other of said recorders to the output of said amplifier and to operate said latter recorder to record the message received by said amplifier.

31. The combination as claimed in claim 30, wherein each of said recorders has its record moved in an opposite direction to rewind the same, and in which said last means and switching means operates, upon the termination of said outgoing message, to cause said first mentioned recorder to rewind its record.

32. The combination according to claim 30, wherein a switch means is provided with means for connecting said telephone instrument thereto to record said outgoing message in said first recorder, and with means to disconnect said telephone from the line circuit the while.

33. The combination according to claim 30, wherein switch means is provided with means for connecting said telephone instrument to said first recorder to play back a message recorded therein, and with means for disconnecting the telephone from said line circuit the while.

34. The combination according to claim 30, wherein switch means in the device is provided with means for connecting said telephone instrument thereto to record in said second recorder, and provided with means to disconnect said telephone from the line circuit the while.

35. The combination as claimed in claim 30, wherein switch means in said device is provided with means for connecting said telephone instrument to said second recorder to play back the message recorded therein, and provided with means for disconnecting said telephone from said line circuit the while.

36. In a device of the character described, a reproducing phonograph including a sound record; a translator in cooperative relation with said record; a recording phonograph including a recording medium; a second translator in cooperative relation with said medium; electrical means including a ringing relay having contacts, said relay being responsive to telephone ringing current said means including a speech circuit adapted to connect said reproducing phonograph to a telephone line upon the operation of said relay; electrical instrumentalities including means operable upon the termination of speech from said reproducing phonograph for disconnecting said first phonograph from a telephone line circuit and connecting said recording phonograph thereto to effect a recording operation; a timer including a motor controlled by said ringing relay contacts, said timer having contacts operated by said last motor; and means including an adjustable member in said timer adapted to adjust the time of operation of said timer contacts and comprising means for pre-setting said timer to operate same for a pre-determined period including the full period of operation of both said phonographs and for stopping both said phonographs at the end of said pre-determined period.

HARRY R. VAN DEVENTER.

References Cited in the file of this patent

UNITED STATES PATENTS

| Number | Name | Date |
|---|---|---|
| 1,845,034 | Bickelhaupt | Feb. 16, 1932 |
| 2,082,303 | Schiller | June 1, 1937 |
| 2,156,094 | Milde | Apr. 25, 1939 |
| 2,221,883 | Rowe | Nov. 19, 1940 |
| 2,284,173 | Soukup | May 26, 1942 |
| 2,366,956 | Clausen | Jan. 9, 1945 |
| 2,472,435 | Peterson | June 7, 1949 |
| 2,525,763 | Beatty | Oct. 17, 1950 |